(12) United States Patent
Shekhar et al.

(10) Patent No.: US 10,260,871 B1
(45) Date of Patent: Apr. 16, 2019

(54) TRAJECTORY ESTIMATION SYSTEM

(71) Applicant: InvenSense, Inc., San Jose, CA (US)

(72) Inventors: Hemabh Shekhar, San Jose, CA (US); Shang Hung Lin, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 710 days.

(21) Appl. No.: 14/537,503

(22) Filed: Nov. 10, 2014

(51) Int. Cl.
*G01C 21/16* (2006.01)
*G01B 21/16* (2006.01)

(52) U.S. Cl.
CPC .................................. *G01B 21/16* (2013.01)

(58) Field of Classification Search
CPC .................................................. G01C 22/006
See application file for complete search history.

(56) References Cited

U.S. PATENT DOCUMENTS

| 2012/0136573 A1* | 5/2012 | Janardhanan | G01C 21/165 701/512 |
| 2014/0122012 A1* | 5/2014 | Barfield | G01C 22/006 702/138 |

* cited by examiner

*Primary Examiner* — Raj R Gupta
(74) *Attorney, Agent, or Firm* — Bay Area Technology Law Group PC

(57) ABSTRACT

A system and method for efficiently determining trajectory and/or location of a device (or user thereof). In a non-limiting example, rotation matrix coefficients may be analyzed in conjunction with stepping information to determine device trajectory and/or location. The system and method may, for example, be implemented in a MEMS sensor system, for example comprising a MEMS gyroscope, MEMS accelerometer, MEMS compass and/or MEMS pressure sensor.

24 Claims, 3 Drawing Sheets

TRAJECTORY ESTIMATION SYSTEM

CROSS-REFERENCE TO RELATED APPLICATIONS/INCORPORATION BY REFERENCE

U.S. Pat. No. 7,104,129 is hereby incorporated herein by reference in its entirety. U.S. patent application Ser. No. 12/106,921, filed Apr. 21, 2008, is hereby incorporated herein by reference in its entirety. U.S. patent application Ser. No. 14/502,168, filed Sep. 30, 2014, is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Knowledge of device and/or user location is often important. Such knowledge generally, however, comes at a high cost, for example a high cost with respect to processor cycles, energy, memory code space, semiconductor real estate, etc. Further limitations and disadvantages of conventional and traditional approaches will become apparent to one of skill in the art, through comparison of such approaches with the disclosure as set forth in the remainder of this application with reference to the drawings.

SUMMARY

Figure 1:
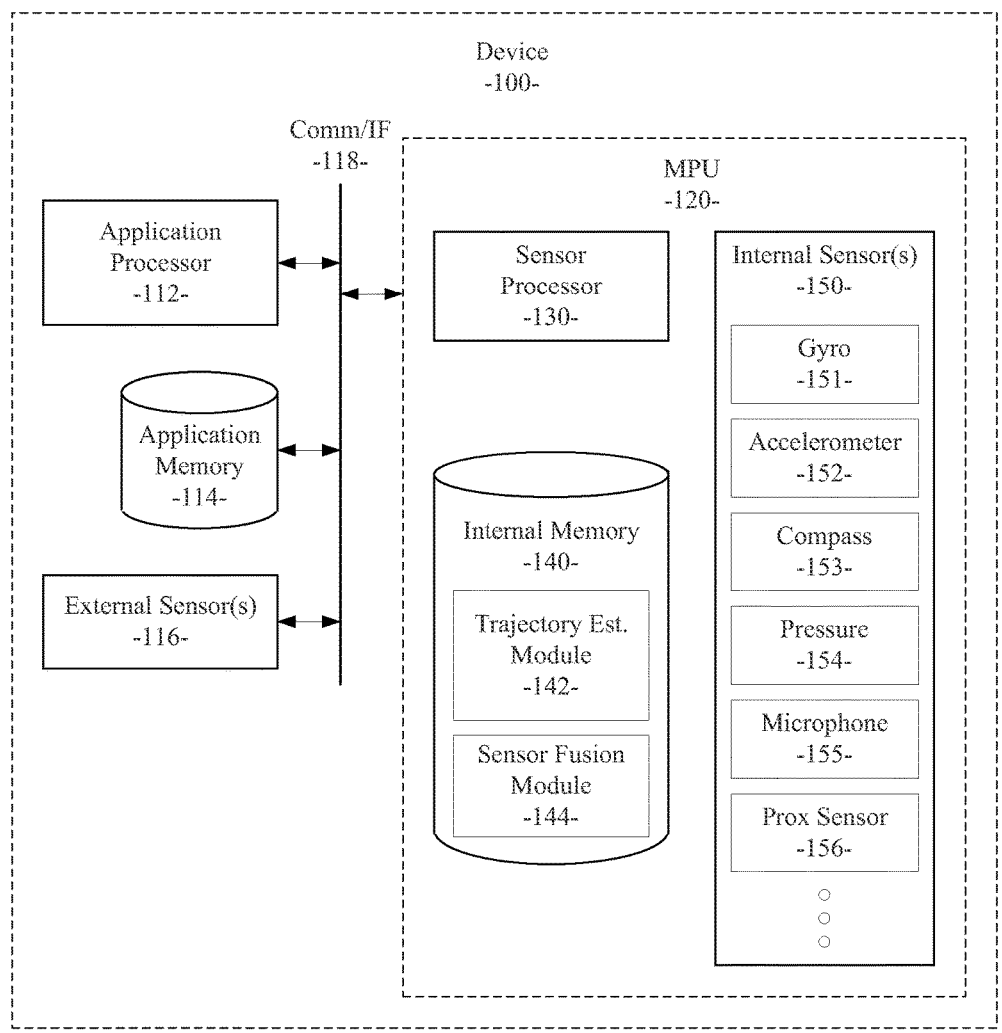
FIG. 1 shows a block diagram of an example electronic device comprising trajectory estimation capability, in accordance with various aspects of the present disclosure.

Various aspects of this disclosure comprise systems and methods for efficiently determining location and/or trajectory of a device (or user thereof). In a non-limiting example, rotation matrix coefficients may be analyzed, for example in conjunction with stepping information, to estimate device position and/or trajectory.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

The following discussion may at times utilize the phrase "A and/or B." Such phrase should be understood to mean just A, or just B, or both A and B. Similarly, the phrase "A, B, and/or C" should be understood to mean just A, just B, just C, A and B, A and C, B and C, or all of A and B and C.

The following discussion may at times utilize the phrases "operable to," "operates to," and the like in discussing functionality performed by particular hardware, including hardware operating in accordance with software instructions. The phrases "operates to," "is operable to," and the like include "operates when enabled to." For example, a module that operates to perform a particular operation, but only after receiving a signal to enable such operation, is included by the phrases "operates to," "is operable to," and the like.

The following discussion may at times refer to various system or device functional modules. It should be understood that the functional modules were selected for illustrative clarity and not necessarily for providing distinctly separate hardware and/or software modules. For example, any one or more of the modules discussed herein may be implemented by shared hardware, including for example a shared processor. Also for example, any one or more of the modules discussed herein may share software portions, including for example subroutines. Additionally for example, any one or more of the modules discussed herein may be implemented with independent dedicated hardware and/or software. Accordingly, the scope of various aspects of this disclosure should not be limited by arbitrary boundaries between modules unless explicitly claimed. Additionally, it should be understood that when the discussion herein refers to a module performing a function, the discussion is generally referring to either a pure hardware module implementation and/or a processor operating in accordance with software. Such software may, for example, be stored on a non-transitory machine-readable medium.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least 2 substrates, wherein the 2 substrates are electrically connected, but do not require mechanical bonding.

A package provides electrical connection between the bond pads on the chip (or for example a multi-chip module) and a metal lead that can be soldered to a printed circuit board (or PCB). A package typically comprises a substrate and a cover. An Integrated Circuit (IC) substrate may refer to a silicon substrate with electrical circuits, typically CMOS circuits. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

In the described embodiments, an electronic device incorporating a sensor may, for example, employ a motion tracking module also referred to as Motion Processing Unit (MPU) that includes at least one sensor in addition to electronic circuits. The at least one sensor may comprise any one or more of a variety of sensors, such as for example a gyroscope, a compass, a magnetometer, an accelerometer, a microphone, a pressure sensor, a proximity sensor, a moisture sensor, a temperature sensor, a biometric sensor, or an ambient light sensor, among others known in the art.

Some embodiments may, for example, comprise an accelerometer, gyroscope, and magnetometer or other compass technology, which each provide a measurement along three axes that are orthogonal relative to each other, and may be referred to as 9-axis devices. Other embodiments may, for example, comprise an accelerometer, gyroscope, compass, and pressure sensor, and may be referred to as 10-axis devices. Other embodiments may not include all the sensors or may provide measurements along one or more axes.

The sensors may, for example, be formed on a first substrate. Various embodiments may, for example, include solid-state sensors and/or any other type of sensors. The electronic circuits in the MPU may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package (e.g., both attached to a common packaging substrate or other material). In other embodiments, the sensors may, for example, be formed on different respective substrates (e.g., all attached to a common packaging substrate or other material).

In an example embodiment, the first substrate is attached to the second substrate through wafer bonding, as described in commonly owned U.S. Pat. No. 7,104,129, which is hereby incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data refers to processed raw data. Processing may, for example, comprise applying a sensor fusion algorithm or applying any other algorithm. In the case of a sensor fusion algorithm, data from one or more sensors may be combined and/or processed to provide an orientation of the device. In the described embodiments, an MPU may include processors, memory, control logic and sensors among structures.

Knowledge of device and/or user location is useful, as is knowledge of user trajectory. For example, a large number of applications (e.g. geofence applications, navigation applications, tracking applications, exercise monitoring applications, etc.) may utilize information of device and/or user location. Accurately and efficiently determining the location of a device (or user thereof), however, provides many challenges. Accordingly, various aspects of the present disclosure provide non-limiting examples of systems and method for efficiently and accurately estimating the trajectory and/or location of a device. The discussion will now turn to discussing the attached figures.

Turning first to FIG. 1, such figure shows a block diagram of an example electronic device 100 comprising trajectory and/or location estimation capability, in accordance with various aspects of the present disclosure. As will be appreciated, the device 100 may be implemented as a device or apparatus, such as a handheld and/or wearable device that can be moved in space by a user, and its motion and/or orientation in space therefore sensed. For example, such a handheld and/or wearable device may comprise a mobile phone (e.g., a cellular phone, a phone running on a local network, or any other telephone handset), wired telephone (e.g., a phone attached by a wire and/or optical tether), personal digital assistant (PDA), pedometer, personal activity and/or health monitoring device, video game player, video game controller, navigation device, mobile internet device (MID), personal navigation device (PND), digital still camera, digital video camera, binoculars, telephoto lens, portable music, video, or media player, remote control, or other handheld device, headset, eyeglasses, or a combination of one or more of these devices.

In some embodiments, the device 100 may be a self-contained device that comprises its own display and/or other user output devices in addition to the user input devices as described below. However, in other embodiments, the device 100 may function in conjunction with another portable device or a non-portable device such as a desktop computer, electronic tabletop device, server computer, smart phone, etc., which can communicate with the device 100, e.g., via network connections. The device 100 may, for example, be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

As shown, the example device 100 comprises an MPU 120, application (or host) processor 112, application (or host) memory 114, and may comprise one or more sensors, such as external sensor(s) 116. The application processor 112 may, for example, be configured to perform the various computations and operations involved with the general function of the device 100 (e.g., running applications, performing operating system functions, performing power management functionality, controlling user interface functionality for the device 100, etc.). The application processor 112 may, for example, be coupled to MPU 120 through a communication interface 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent. The application memory 114 may, for example, comprise programs, drivers or other data that utilize information provided by the MPU 120. Details regarding example suitable configurations of the application (or host) processor 112 and MPU 120 may be found in co-pending, commonly owned U.S. patent application Ser. No. 12/106,921, filed Apr. 21, 2008, which is hereby incorporated herein by reference in its entirety.

In this example embodiment, the MPU 120 is shown to comprise a sensor processor 130, internal memory 140 and one or more internal sensors 150. The internal sensors 150 comprise a gyroscope 151, an accelerometer 152, a compass 153 (for example a magnetometer), a pressure sensor 154, a microphone 155, and a proximity sensor 156. Though not shown, the internal sensors 150 may comprise any of a variety of sensors, for example, a temperature sensor, light sensor, moisture sensor, biometric sensor, etc. All or some of the internal sensors 150 may, for example, be implemented as MEMS-based motion sensors, including inertial sensors such as a gyroscope or accelerometer, or an electromagnetic sensor such as a Hall effect or Lorentz field magnetometer. As desired, one or more of the internal sensors 150 may be configured to provide raw data output measured along three orthogonal axes or any equivalent structure. The internal memory 140 may store algorithms, routines or other instructions for processing data output by one or more of the internal sensors 120, including the trajectory estimation module 142 and sensor fusion module 144, as described in more detail herein. If provided, external sensor(s) 116 may comprise one or more sensors, such as accelerometers, gyroscopes, magnetometers, pressure sensors, microphones, proximity sensors, and ambient light sensors, biometric sensors, temperature sensors, and moisture sensors, among other sensors. As used herein, an internal sensor generally refers to a sensor implemented, for example using MEMS techniques, for integration with the MPU 120 into a single chip. Similarly, an external sensor as used herein generally refers to a sensor carried on-board the device 100 that is not integrated into the MPU 120.

Even though various embodiments may be described herein in the context of internal sensors implemented in the MPU 120, these techniques may be applied to a non-integrated sensor, such as an external sensor 116, and likewise trajectory estimation module 142 may be implemented using instructions stored in any available memory resource, such as for example the application memory 114, and may be executed using any available processor, such as for example the application processor 112. Still further, the functionality performed by the trajectory estimation module 142 may be implemented using any combination of hardware, firmware and software.

As will be appreciated, the application (or host) processor 112 and/or sensor processor 130 may be one or more microprocessors, central processing units (CPUs), microcontrollers or other processors, which run software programs for the device 100 and/or for other applications related to the functionality of the device 100. For example, different software application programs such as menu navigation software, games, camera function control, navigation software, and telephone, or a wide variety of other software and functional interfaces, can be provided. In some embodiments, multiple different applications can be provided on a single device 100, and in some of those embodiments, multiple applications can run simultaneously on the device 100. Multiple layers of software can, for example, be provided on a computer readable medium such as electronic memory or other storage medium such as hard disk, optical disk, flash drive, etc., for use with application processor 112 and sensor processor 130. For example, an operating system layer can be provided for the device 100 to control and manage system resources in real time, enable functions of application software and other layers, and interface application programs with other software and functions of the device 100. In various example embodiments, one or more motion algorithm layers may provide motion algorithms for lower-level processing of raw sensor data provided from internal or external sensors. Further, a sensor device driver layer may provide a software interface to the hardware sensors of the device 100. Some or all of these layers can be provided in the application memory 114 for access by the application processor 112, in internal memory 140 for access by the sensor processor 130, or in any other suitable architecture (e.g., including distributed architectures).

In some example embodiments, it will be recognized that the example architecture depicted in FIG. 1 may provide for trajectory and/or location estimation to be performed using the MPU 120 and might not require involvement of the application (or host) processor 112 and/or application memory 114. Such example embodiments may, for example, be implemented with one or more internal sensor sensors 150 on a single chip and/or a multi-chip. Moreover, as will be described below, the trajectory and/or location estimation techniques may be implemented using computationally efficient algorithms to reduce processing overhead and power consumption.

As mentioned herein, a trajectory and/or location estimation module may be implemented by a processor (e.g., the sensor processor 130) operating in accordance with software instructions (e.g., the trajectory estimation module 142 stored in the internal memory 140), or by a pure hardware solution. The discussion of FIGS. 2 and 3 will provide further example details of at least the operation of the sensor fusion software module 144 and the trajectory estimation module 142 (e.g., when executed by a processor such as the sensor processor 130). It should be understood that any or all of the functional modules discussed herein may be implemented in a pure hardware implementation and/or by a processor operating in accordance with software instructions. It should also be understood that any or all software instructions may be stored in a non-transitory computer-readable medium.

Various aspects of this disclosure comprise determining a trajectory and/or location of a device by, at least in part, analyzing transformation coefficients that are generally utilized to transform a position, vector, velocity, acceleration, etc., from a first coordinate system to a second coordinate system. Such a transformation may be generally performed by multiplying an input vector expressed in the first coordinate system by a transformation matrix. General transformation matrices comprise translation coefficients and rotation coefficients. For illustrative clarity, the discussion herein will focus on rotation coefficients. Note, however, that the scope of various aspects of this disclosure is not limited to rotation coefficients.

The rotational aspects of a transformation matrix may, for example, be expressed as a rotation matrix. In general, a rotation matrix (e.g., a direction cosine matrix or DCM) may be utilized to rotationally transform coordinates (e.g., of a vector, position, velocity, acceleration, force, etc.) expressed in a first coordinate system to coordinates expressed in a second coordinate system. For example, a direction cosine matrix R may look like:

$$R = \begin{bmatrix} R_{11} & R_{12} & R_{13} \\ R_{21} & R_{22} & R_{23} \\ R_{31} & R_{32} & R_{33} \end{bmatrix}$$

In an example scenario in which a first vector $A_b$ expresses coordinates of a point in a body (or device) coordinate system and a second vector $A_w$ expresses coordinates of a point in a world (or inertial) coordinate system, the following equation may be used to determine $A_w$ from $A_b$:

$$A_w = R\,A_b$$

The third row of the rotation matrix R may, for example, be generally concerned with determining the z-axis component of the world coordinate system, $A_w^z$, as a function of the matrix coefficients $R_{31}$, $R_{32}$, and $R_{33}$ multiplied by respective $A_b^x$, $A_b^y$, and $A_b^z$ values of the body coordinate vector $A_b$, which are then summed.

For example $R_{33}$, which may also be referred to herein as $g_z$, is the extent to which the z axis of the body coordinate system is aligned with the z axis of the world coordinate system. In a mobile telephone scenario, the z axis in the body coordinate system may, for example, be defined as extending orthogonally from the face of the telephone. The z axis of the world coordinate system may, for example, be aligned with gravity and point upward from the ground. A value of $R_{33}=1$ means that the z axis in the body coordinate system is perfectly aligned with the z axis of the world coordinate system, and thus there is a 1-to-1 mapping.

Also for example $R_{32}$, which may also be referred to herein as $g_y$, is the extent to which the y axis of the body coordinate system is aligned with the z axis of the world coordinate system. In a telephone scenario, the y axis may, for example, be defined as extending out the top of the phone along the longitudinal axis of the phone. A value of $R_{32}=1$ means that the y axis in the body coordinate system is perfectly aligned with the z axis of the world coordinate system, and thus there is a 1-to-1 mapping.

Additionally for example $R_{31}$, which may also be referred to herein as $g_x$, is the extent to which the x axis of the body coordinate system is aligned with the z axis of the world coordinate system. In a telephone scenario, the x axis may for example be defined as extending out the right side of the phone when looking at the face of the phone along the lateral axis of the phone. A value of $R_{31}=1$ means that the x axis in the body coordinate system is perfectly aligned with the z axis of the world coordinate system, and thus there is a 1-to-1 mapping.

As a last example, if $R_{31}=0$, $R_{32}=1/\text{sqrt}(2)$, and $R_{33}=1/\text{sqrt}(2)$, then:
1) The x axis of the body coordinate system is orthogonal to the z axis of the world coordinate system;
2) The y axis of the body coordinate system is 45° relative to the z axis of the world coordinate system; and
3) The z axis of the body coordinate system is 45° relative to the z axis of the world coordinate system.

In the above scenario, the third row of the rotation matrix R may be referred to as a gravity vector g. The rotation matrix R with the gravity vector labeled may for example be shown as follows:

$$R = \begin{bmatrix} R_{11} & R_{12} & R_{13} \\ R_{21} & R_{22} & R_{23} \\ [g_x & g_y & g_z] \end{bmatrix}$$

The first two rows of the rotation matrix R are generally related to projecting (or mapping) an input vector expressed in the device (or body) coordinate system on the x-y plane of the world coordinate system. For example, the 2×1 vector $[R_{11}\ R_{21}]$ generally relates to projecting the x-axis component of a vector expressed in the body coordinate system on the world coordinate x-y plane, the 2×1 vector $[R_{12}\ R_{22}]$ generally relates to projecting the y-axis component of a vector expressed in the body coordinate system on the world coordinate x-y plane, and the 2×1 vector $[R_{13}\ R_{23}]$ generally relates to projecting the z-axis component of a vector expressed in the body coordinate system on the world coordinate x-y plane. Additional discussion of such vectors is included herein. The rotation matrix R with the gravity vector labeled and with the x-y projection vectors labeled as e vectors may be shown as follows:

$$R = \begin{bmatrix} \begin{bmatrix} e_{1x} \\ e_{1y} \end{bmatrix} & \begin{bmatrix} e_{2x} \\ e_{2y} \end{bmatrix} & \begin{bmatrix} e_{3x} \\ e_{3y} \end{bmatrix} \\ [g_x & g_y & g_z] \end{bmatrix}$$

The coefficients of the rotation matrix R express an instantaneous rotational relationship, but as a device moves, the coefficients change over time. In such a scenario, the matrix R coefficients may, for example, be updated on a periodic basis at an update rate that is implementation dependent (e.g., at a sensor update rate, at a user step rate, at 100 Hz, 10 Hz, 1 Hz, 51 Hz, 200 Hz, 500 Hz, 1000 Hz rate, etc.) and/or situation dependent. Each of the matrix R coefficients may thus be viewed and/or processed individually and/or in aggregate as a discrete time signal.

A rotation matrix R may, for example, be output from one or more system modules that integrate information from various sensors (e.g., acceleration sensors, gyroscopes, compasses, pressure sensors, etc.) to ascertain the present orientation of a device. Such a rotation matrix R may, for example in various implementations, be derived from quaternion processing.

In an example implementation, also discussed elsewhere herein, a Direction Cosine Matrix (DCM) module (e.g., as will be discussed herein at least with regard to FIGS. 2 and 3) may receive orientation information as input, for example quaternion information and/or Euler angle information from a sensor fusion module, and process such input orientation information to determine the rotation matrix R. In an example implementation, the DCM module may receive quaternion information that is updated at a sensor rate (or sensor sample rate), for example 51 Hz or a different rate less than or greater than 51 Hz. In an example implementation, the DCM module may, however, determine the rotation matrix R at a rate that is equal to a user step rate, a multiple of the user step rate, a fraction of the user step rate, some other function of the user step rate, etc. In other words, the DCM module may determine the rotation matrix R at a rate that is less than the update rate of the information (e.g., orientation information) input to the DCM module. For example, in an example implementation, the DCM module may determine the rotation matrix R only when a step has been detected and/or suspected. Thus, when no stepping is detected, no updating of the rotation matrix R occurs.

Analyzing the values of the rotation matrix R coefficients, for example as they change over time and/or instantaneously, provides insight into how the device is moving, for example providing insight into how a user is moving with the device. Such analysis may, for example, result in a determined location and/or trajectory.

For illustrative simplicity, the following discussion will address analyzing various rotation matrix R coefficients over time, for example discrete time signals, to determine device or user location and/or trajectory. The scope of this disclosure is not, however, limited to a particular number of coefficients being analyzed and/or the manner in which a discrete time signal associated with a particular one or more coefficients is analyzed.

Additionally for example, though the following discussion will generally address analyzing rotation matrix coefficients, other signals indicative of orientation may similarly be analyzed, for example, raw sensor data, motion data, sensor data transformed to the world coordinate system, etc. The analysis of rotational matrix coefficients generally disclosed herein is presented for illustrative convenience and clarity, but the scope of various aspects of this disclosure should not be limited thereby.

Various aspects of this disclosure focus on the x-y plane of the world coordinate system. It should be understood that the trajectory and/or location determinations discussed herein may also include the z-axis, for example vertical height in the world coordinate system. In such a scenario, trajectory and/or location elevation may be determined in at least manner generally analogous to the x-y position discussed herein.

Various aspects of this disclosure refer to a body coordinate system and a world coordinate system. Unless identified more specifically, references to the body coordinate system include a device coordinate system, a component or package coordinate system, a chip coordinate system, a sensor coordinate system, etc. The world coordinate system may also be referred to herein as an inertial coordinate system.

Various aspects of this disclosure will now be presented by discussion of additional example systems. It should be noted that the systems herein are presented for illustrative clarity and convenience, and the scope of this disclosure should not be limited by any particular characteristics of the example(s) presented herein.

Figure 2:
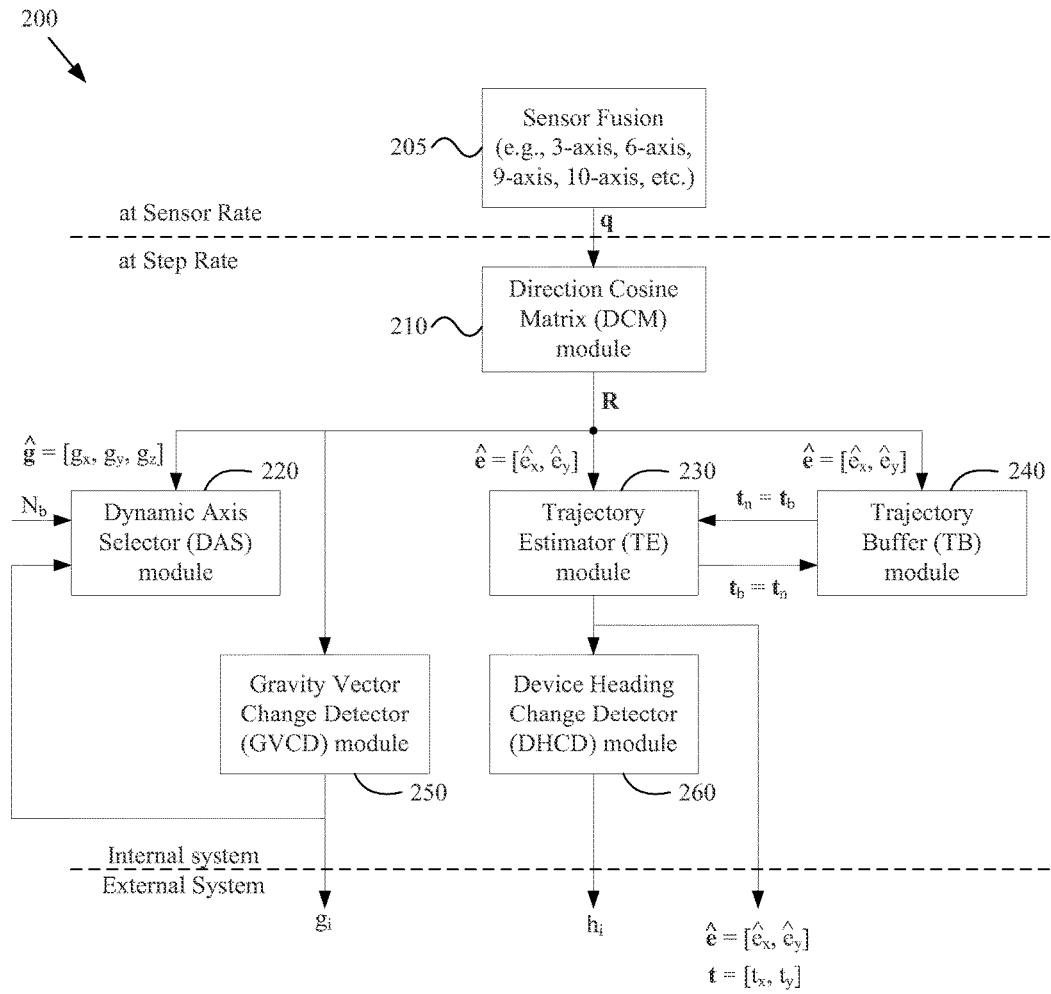
FIG. 2 shows an example trajectory estimation system in accordance with various aspects of the present disclosure.

Turning now to FIG. 2, such figure shows an example trajectory and/or location estimation system 200 in accordance with various aspects of the present disclosure. The example system 200 may, for example, share any or all characteristics with the example system 100 illustrated in FIG. 1 and discussed herein. For example, some or all of the example system 200 (e.g., any or all of the functional blocks or modules discussed herein) may be implemented by a trajectory estimation module (e.g., the sensor processor 130 operating in accordance with trajectory estimation module software 142, operating in accordance with sensor fusion module software 144, etc.).

The example system 200 may, for example, comprise a sensor fusion module 205, direction cosine matrix (DCM) module 210, dynamic axis selection (DAS) module 220, trajectory estimator (TE) module 230, trajectory buffer (TB) module 240, gravity vector change detector (GVCD) module 250, device heading change detector (DHCD) module 260, an interface for communicating with another system (e.g., a system that is internal or external to a sensor chip and/or package implementing the system 200), etc.

The sensor fusion module 205 may, for example, receive sensor information from one or more sensors (e.g., an accelerometer sensor, gyroscope, compass, pressure sensor, etc.) and process such information to determine an orientation of the device utilizing the system 200. It should be noted that for the sake of this discussion, orientation of the device generally means the attitude of the device in free space, including for example attitude of a sensor package and/or chip implementing the system 200. Though the discussion herein may generally refer to device orientation, it should be understood that such reference also includes orientation of the sensor package, sensor chip, sensor board, etc., all of which are capable of being attached to the device, unless additional specificity is provided.

The sensor fusion module 205 may, for example, output information (e.g., stored in memory, communicated in a transmitted signal, etc.) indicative of orientation of the device. Such information may, for example comprise quaternion information, Euler angle information, etc. For this example, the sensor fusion module 205 outputs quaternion information q.

The direction cosine matrix (DCM) module 210 may, for example, receive the orientation information (e.g., read from memory, received in a signal transmitted by the sensor fusion module 205, etc.). The DCM module 210 may, for example, determine and generate a rotation matrix R (or DCM). The DCM module 210 may, for example receive quaternion information, process such information, and generate the rotation matrix R, as discussed herein. The DCM module 210 may, for example, determine or update the rotation matrix R at the step rate, for example as opposed to the rate (e.g., sensor update rate) at which information is provided to the DCM module 210. In an example implementation, the DCM module 210 may normalize at least the first two rows of the rotation matrix R, for example to remove magnitude information and retain direction information of the projection of a vector expressed in a body coordinate system on the world coordinate x-y plane. For example, the normalized 2×1 unit vector $$[\hat{e}_{1x} \hat{e}_{1y}]^T = [R_{11} R_{21}]^T / \sqrt{(R_{11}^2 + R_{21}^2)}$$

generally relates to projecting the x-axis component of a vector expressed in the body coordinate system on the world coordinate x-y plane and normalizing the projection to unity for estimating the direction of body (or device) travel, the normalized 2×1 unit vector $$[\hat{e}_{2x} \hat{e}_{2y}]^T = [R_{12} R_{22}]^T / \sqrt{(R_{12}^2 + R_{22}^2)}$$

generally relates to projecting the y-axis component of a vector expressed in the body coordinate system on the world coordinate x-y plane and normalizing the projection to unity for estimating the direction of body (or device) travel, and the normalized 2×1 unit vector $$[\hat{e}_{3x} \hat{e}_{3y}]^T = [R_{13} R_{23}]^T / \sqrt{(R_{13}^2 + R_{23}^2)}$$

generally relates to projecting the z-axis component of a vector expressed in the body coordinate system on the world coordinate x-y plane and normalizing the projection to unity for estimating the direction of body (or device) travel.

The modified matrix $\tilde{R}$ with the gravity vector labeled and with the normalized x-y projection vectors labeled may be shown as follows:

$$\tilde{R} = \begin{bmatrix} \begin{bmatrix} \hat{e}_{1x} \\ \hat{e}_{1y} \end{bmatrix} & \begin{bmatrix} \hat{e}_{2x} \\ \hat{e}_{2y} \end{bmatrix} & \begin{bmatrix} \hat{e}_{3x} \\ \hat{e}_{3y} \end{bmatrix} \\ g_x & g_y & g_z \end{bmatrix}$$

The Dynamic Axis Selector (DAS) module 220 may, for example, receive various coefficients of the matrix $\tilde{R}$, for example the gravity vector coefficients [$g_x$ $g_y$ $g_z$], and analyze such coefficients to select at least one of the three normalized position vectors for further processing.

As discussed above, the first column of the rotation matrix R concerns the projection of an x-axis component of a vector expressed the body coordinate system onto the x, y, and z axes of the world coordinate system. For example, in the first column of the rotation matrix R, the $R_{11}$ and $R_{21}$ coefficients reflect the extent to which an x-axis component of a vector expressed in the body coordinate system projects onto the x-y plane of the world coordinate system, and the $R_{31}$ coefficient (or $g_x$) reflects the extent to which the x-axis component of the vector expressed in the body coordinate system projects along the z axis of the world coordinate system (also referred to as the gravity axis). Also for example, in the second column of the rotation matrix R, the $R_{12}$ and $R_{22}$ coefficients reflect the extent to which a y-axis component of a vector expressed in the body coordinate system projects onto the x-y plane of the world coordinate system, and the $R_{32}$ (or $g_y$) coefficient reflects the extent to which the y-axis component of the vector expressed in the body coordinate system projects along the z axis of the world coordinate system. Additionally for example, in the third column of the rotation matrix R, the $R_{13}$ and $R_{23}$ coefficients reflect the extent to which a z-axis component of a vector expressed in the body coordinate system projects onto the x-y plane of the world coordinate system, and the $R_{33}$ (or $g_z$) coefficient reflects the extent to which the z-axis component of the vector expressed in the body coordinate system projects along the z axis of the world coordinate system.

In an example system implementation, the general concern for trajectory estimation may coincide with the x-y plane of the world coordinate system. In such a two-dimensional scenario, for trajectory estimation purposes, a single 2×1 vector (e.g., either $[\hat{e}_{1x}\ \hat{e}_{1y}]^T$, $[\hat{e}_{2x}\ \hat{e}_{2y}]^T$, or $[\hat{e}_{3x}\ \hat{e}_{3y}]^T$) of the matrix $\tilde{R}$ may be sufficient for estimating movement direction in the x-y plane of world coordinate system. The Dynamic Axis Selection (DAS) module 220 may, for example, select a best one of such vectors. A best one of such vectors may, for example, be the vector with the strongest projection onto the x-y plane of the world coordinate system, which may for example generally coincide with the weakest projection along the z-axis of the world coordinate system. In other words, if an axis of the body coordinate system has no projection or a weak projection along the z-axis of the world coordinate system, then such axis will have a complete projection or a strong projection, respectively, on the x-y plane of the world coordinate system. To state it another way, the axis of the body coordinate system that is the least relevant for projection along the z-axis of the world coordinate system may be the most relevant for projection on the x-y plane of the world coordinate system.

The DAS module 220 may thus identify the column of the matrix $\tilde{R}$ that has the weakest gravity vector coefficient (e.g., in the third row), and select the normalized 2×1 vector in the first two rows of the identified column. For example, if $R_{31}$ (or $g_x$) is lower than $R_{32}$ and $R_{33}$, then the DAS module 220 may identify the first column of the matrix $\tilde{R}$ and select $[\hat{e}_{1x}\ \hat{e}_{1y}]^T$ as the best vector to utilize for determining movement direction in the x-y plane of the world coordinate system. Also for example, if $R_{32}$ (or $g_y$) is lower than $R_{31}$ and $R_{33}$, then the DAS module 220 may identify the second column of the matrix $\tilde{R}$ and select $[\hat{e}_{2x}\ \hat{e}_{2y}]^T$ as the best vector to utilize for determining movement direction in the x-y plane of the world coordinate system. Additionally for example, if $R_{33}$ (or $g_z$) is lower than $R_{31}$ and $R_{32}$, then the DAS module 220 may identify the third column of the matrix $\tilde{R}$ and select $[\hat{e}_{3x}\ \hat{e}_{3y}]^T$ as the best vector to utilize for determining movement direction in the x-y plane of the world coordinate system. The selected vector may be referred to herein as the ê vector. Again, the matrix $\tilde{R}$ with gravity vector and ê vector coefficients labeled and grouped may be shown as:

$$\tilde{R} = \begin{bmatrix} \begin{bmatrix} \hat{e}_{1x} \\ \hat{e}_{1y} \end{bmatrix} & \begin{bmatrix} \hat{e}_{2x} \\ \hat{e}_{2y} \end{bmatrix} & \begin{bmatrix} \hat{e}_{3x} \\ \hat{e}_{3y} \end{bmatrix} \\ g_x & g_y & g_z \end{bmatrix}$$

In an example implementation, the DAS module 220 may select an ê vector only when it has been determined that a detected potential user step is a valid step. For example, as discussed in U.S. patent application Ser. No. 14/502,168, filed Sep. 30, 2014, and titled Multi-band Pedometer with Mobility Mode Indicator, which is hereby incorporated herein by reference in its entirety, a step buffer module or other module (e.g., of a pedometer) may output a signal $N_b$ (or other information) that indicates a number of steps that have occurred since reset or may, for example, output a binary flag indicating whether valid stepping is occurring. The DAS module 220 vector (or axis) selection may for example be enabled by and/or occur in response to (e.g., triggered by) such $N_b$ signal. In such an example, the DAS module 220 may advantageously be kept from selecting an ê vector based on bad information associated with false step detection.

Also for example, the DAS module 220 may select an ê vector when a substantial shift in device orientation has been detected. As an example, as discussed herein, the GVCD module 250 may output a gravity change indicator, $g_i$, to indicate a substantial shift in the gravity vector. The DAS module 220 may, for example, receive the gravity change indicator, and the gravity change indicator may trigger axis selection (or re-selection) by the DAS module 220.

Additionally for example, the DAS module 220 may perform the dynamic axis selection continually, for example at a detected user step rate (or cadence). Such axis (or vector) selection may, for example, be filtered (e.g., using hysteresis, rolling averaging, etc.) to avoid rapid toggling of the axis selection when operating near a decision point.

The DAS module 220 may, for example, generate information of its axis (or vector) selection. The DAS module 220 may, for example, store information identifying the selected vector and/or the coefficients of the selected vector in a memory. The DAS module 220 may also, for example, communicate information identifying the selected vector and/or the coefficients of the selected vector in a signal transmitted to other modules, for example the Trajectory Estimator (TE) module 230 and/or Trajectory Buffer (TB) module 240 discussed herein.

The trajectory estimator (TE) module 230 may, for example, analyze the ê vector selected by the DAS module 220 to determine a direction of travel in the x-y plane of the world coordinate system. The TE module 230 may, for example, analyze the selected e vector at each detected step. For example, the TE module 230 may multiply the selected ê vector, which has been normalized, by a stride length (e.g., a constant stride length, a default stride length of for example one meter, a stride length determined by a stride length estimator module 270 discussed herein, etc.) to determine a present movement or trajectory. The TE module 230 may then, for example in various implementations, determine an estimated location by adding (or integrating) the determined present trajectory to the previously estimated location. For example at step n, if the selected vector ê is $[\hat{e}_{x,n}\ \hat{e}_{y,n}]^T$, the TE module 230 may determine the user's trajectory at step $$t_{x,n} = t_{x,n-1} + \rho\hat{e}_{x,n} \text{ and}$$

$$t_{y,n} = t_{y,n-1} + \rho\hat{e}_{y,n}.$$

The TE module 230 may provide various outputs. For example, the TE module 230 may output the e vector, the normalized e vector (or ê), the present estimation of overall trajectory t, a normalized present estimation of overall trajectory t (or t hat), ê etc. The e or ê vector may be scaled by a factor ρ that is the stride length output from SLE module 370, which is discussed herein. In an example system implementation, a device utilizing the system 200 illustrated in FIG. 2 may perform its own trajectory integration using the e or ê vectors, for example updated at the step rate, instead of utilizing the integration capability of the TE module 230 as described herein. The TE module 230 may flexibly output any or all of the above-mentioned outputs to accommodate device system needs. In an example implementation, the system 200 comprises a program interface by which another system that utilizes the system 200 may configure the output of the TE module 230.

The trajectory buffer (TB) module 240 may, be utilized to integrate and buffer an estimated trajectory while user stepping is suspected but has not yet been validated. For example, in such a manner, the estimated trajectory stored in the TE module 230 might not be updated until the user stepping has been validated. For example, as discussed in U.S. patent application Ser. No. 14/502,168, filed Sep. 30, 2014, and titled Multi-band Pedometer with Mobility Mode Indicator, which is hereby incorporated herein by reference in its entirety, a step buffer module or other module of a system with step counting capability (e.g., of a pedometer) may output an indication of when user stepping has been validated. For example, a particular number of detected steps (e.g., five steps) may need to be detected before it is determined that valid stepping activity is occurring. Also, for example, instead of or in addition to receiving information of valid stepping from another source, the TB module 240 may perform its own analysis to determine when user stepping is occurring (e.g., by counting potential steps and comparing the count to a threshold). When the TB module 240 determines that valid stepping is occurring (e.g., by receiving a signal, through its own calculations, etc.), the TB module 240, which during the period of uncertainty has been tracking trajectory instead of the TE module 230, may communicate the tracked trajectory to the TE module 230. The TE module 230 may then, for example, take over the tracking activity from the TB module 240.

In other words, the TB module 240 may track the trajectory, which may also include location, until a particular level of confidence is reached that actual user stepping is occurring. When the TE module 230 is tracking trajectory and stepping becomes uncertain, for example when no stepping activity is detected for a period of time (e.g., for three seconds, for two seconds, etc.), then the TE module 230 may stop tracking the trajectory and/or location, pass the latest known trajectory and/or location to the TB module 240, and the TB module 240 may then take over trajectory and/or location tracking until stepping is once again validated. Then when stepping is again validated, the TB module 240 may communicate the tracked trajectory and/or location to the TE module 230, which may again take over tracking while detected stepping continues.

In various use scenarios, for example when a user is manipulating the device in a manner that causes substantial orientation changes, confidence in the estimated user trajectory may decrease substantially. In such a scenario, it may be advantageous to notify the operating system (O/S) or host of the device (or other system incorporating various aspects of this disclosure) of the decrease in confidence level. The host may then determine subsequent actions, for example utilizing other positioning systems (e.g., GPS, cellular triangulation, Wi-Fi network detection or triangulation, etc.) to determine the trajectory or location of the device. Because utilizing such other positioning systems is generally associated with utilizing more energy than used by a system operating in accordance with various aspects of this disclosure, the host may be motivated to only utilize such other positioning systems when necessary.

In accordance with various aspects of this disclosure, there are at least two modules that may monitor device orientation and/or position and output an indicator to the host when a condition potentially warranting more host activity (e.g., interacting with other positioning systems) is detected.

For example, a Gravity Vector Change Detector (GVCD) module 250 may operate to detect when the device (e.g., a phone) tilts or changes present tilt by more than a threshold (e.g., 45°, 30°, 65°, etc.), and when such detection occurs output a gravity change indicator, $g_i$. Such a gravity change indicator may, for example, comprise a binary flag, data indicative of an amount of change, etc. The GVCD module 250 may determine the gravity vector change in any of a variety of manners. For example, the GVCD module 250 may monitor any or all of the gravity vector coefficients to determine when a change is significant enough (e.g., greater than a threshold) to warrant generating the gravity change indicator. For example, the GVDC module 250 may select a reference gravity vector (e.g., a gravity vector state at which an initial or most recent e vector was selected by the DAS module 220, an average gravity vector state for a time window, etc.). The GVDC module 250 may then calculate a vector inner product to determine the extent to which the present gravity vector is aligned or misaligned with the reference gravity vector.

Device orientation may be changed substantially without affecting the gravity vector. The system 200 may thus also comprise a Device Heading Change Detection (DHCD) module 260 that does not rely on (or rely exclusively on), the gravity vector. The DHCD module 260 may, for example, operate to detect when the device (e.g., a phone) changes heading in the x-y plane by more than a threshold amount (e.g., 45°, 30°, 65°, etc.), and when such detection occurs output a heading change indicator, $h_i$. Such a heading change indicator may, for example, comprise a binary flag, data indicative of an amount of direction change, etc.

The DHCD module 260 may determine the heading change in any of a variety of manners. For example, the DHCD module 260 may monitor the output trajectory information from the TE module 230. Also for example, the DHCD module 260 may monitor any or all of the coefficients of the matrix R̃ (e.g., coefficients in the first two rows of the matrix R̃). For example, the DHCD module 260 may select a reference trajectory vector (e.g., an initial or most recent e or ê vector selected by the DAS module 220, an average e or ê vector detected during a time window, etc.). The DHCD module 260 may then calculate a vector inner product to determine the extent to which the present e or ê vector is aligned or misaligned with the reference e or ê vector.

It should be noted that a change in gravity vector and/or device heading may be due to device movement, but may also be due to sensor signals that occur without orientation changes, for example sensor biases. In such an example scenario, even though a device might not have changed orientation, sensor biases (e.g., gyroscope bias) may cause it to appear as though the device has changed orientation. In an example implementation, the gravity change indicator and/or heading change indicator may be generated to notify the host (e.g., a host operating system or other component) that a substantial change or perception of change in the device orientation has occurred.

The system output interface of the system 200 illustrated in FIG. 2 is shown as a dashed line near the bottom of FIG. 2. For example, the system 200 may be implemented as an integrated circuit chip communicating with an external system (e.g., other components of a mobile phone, health monitoring watch, pedometer, bracelet, etc.) into which the integrated circuit chip is incorporated (e.g., as a chip or package). In an example implementation, the outputs may be on respective dedicated integrated circuit pins or may be on a shared pin. Also for example, the outputs may be configurable (e.g., a device operating system or host processor can program the integrated circuit to output particular outputs, provide a configurable set of fields in an output data structure, etc.).

The example system 200 illustrated in FIG. 2 and discussed herein may, for example, be augmented by the incorporated of one or more additional modules. Many of such modules will now be discussed with reference to FIG. 3.

Figure 3:
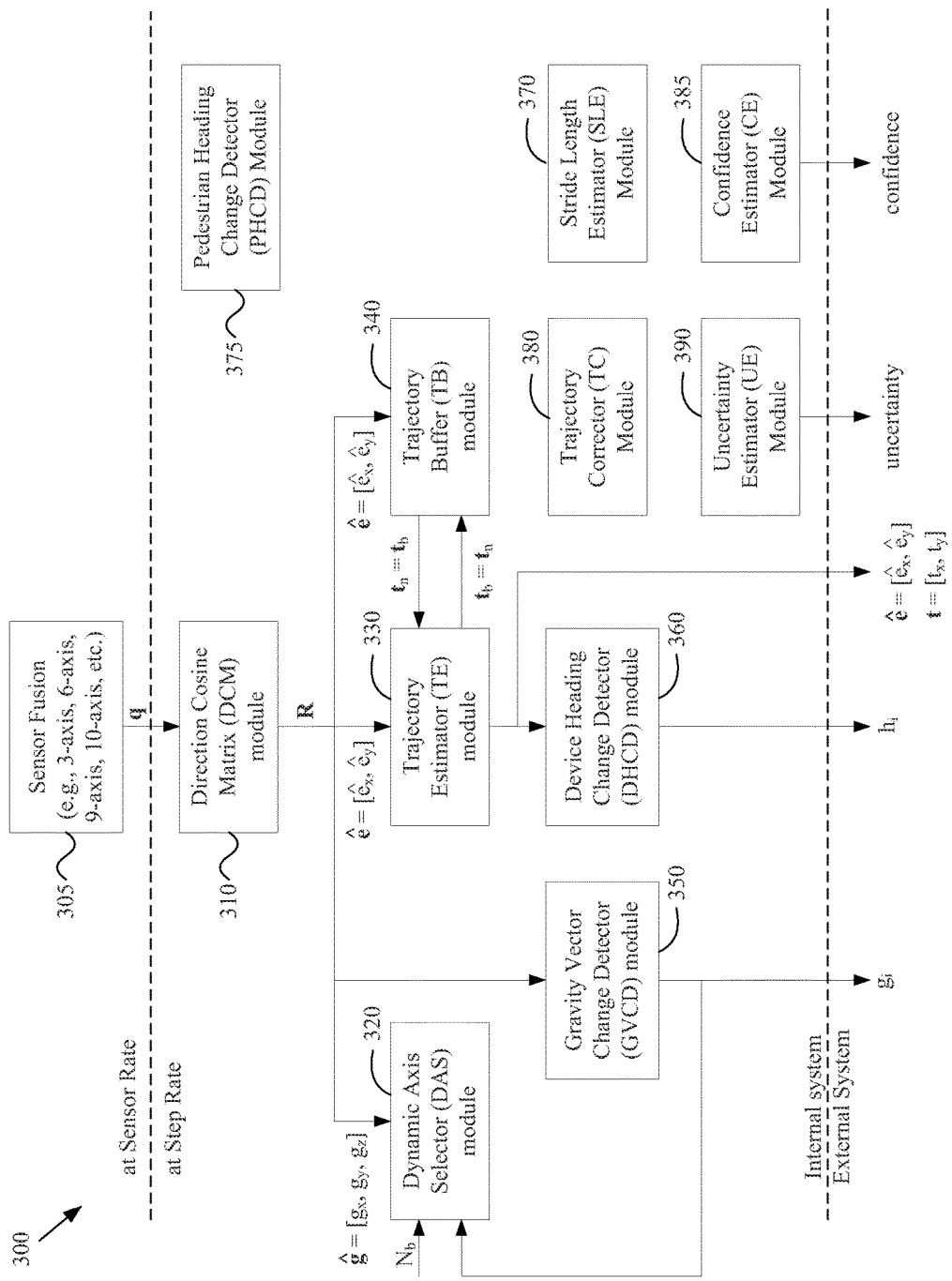
FIG. 3 shows an example trajectory estimation system in accordance with various aspects of the present disclosure.

Turning now to FIG. 3, such figure shows an example trajectory estimation system 300 in accordance with various aspects of the present disclosure. The example system 300 may, for example, share any or all characteristics with the example system 200 illustrated in FIG. 2 and discussed herein and/or with the example system 100 illustrated in FIG. 1 and discussed herein. For example, some or all of the example system 300 (e.g., any or all of the functional blocks or modules discussed herein) may be implemented by a trajectory estimation module (e.g., the sensor processor 130 operating in accordance with trajectory estimation module software 142, operating in accordance with sensor fusion module software 144, etc.).

The system 300 illustrated in FIG. 3, for example, comprises modules the same as or similar to the modules illustrated in FIG. 2 and discussed herein. The example system 300 may, for example, comprise a sensor fusion module 305, direction cosine matrix (DCM) module 310, dynamic axis selection (DAS) module 320, trajectory estimator (TE) module 330, trajectory buffer (TB) module 340, gravity vector change detector (GVCD) module 350, device heading change detector (DHCD) module 360, an interface for communicating with another system (e.g., a system that is internal or external to a sensor chip and/or package implementing the system 300), etc. The example system 300 may also comprise a stride length estimator (SLE) module 370, a pedestrian heading change detector (PHCD) module 375, a trajectory corrector (TC) module 380, a confidence estimator module (CE) 385, an uncertainty estimator (UE) module 390, each of which are discussed herein.

As discussed herein various aspects of this disclosure may comprise determining trajectory (or location) based on an estimated stride length. For example a stride length of one meter may be utilized that, when multiplied by a selected ê vector, results in an estimated step vector. Stride length may, however, vary from user-to-user and/or from activity-to-activity.

Various aspects of this disclosure may thus comprise various manners of determining the stride length to utilize in determining trajectory (or location). For example, a user input may be utilized to estimate user stride length. For example, a user input may directly indicate stride length, a user input indicative of user height and/or inseam length may be utilized to determine an estimated stride length based at least in part on the user's height and/or inseam length, a user input of activity (e.g., indicating walking, running, sporting activity, etc.) may be utilized to estimate stride length (e.g., longer when running and shorter when walking), a user input identifying the user may be utilized to estimate stride length (e.g., in a scenario in which different users of a device are associated with different respective stride lengths), etc.

Various aspects of this disclosure may, for example, comprise utilizing GPS, triangulation, and/or other positioning systems to determine one or more estimated stride lengths to utilize for a user. For example, the SLE module 370 may comprise dividing a monitored distance (e.g., based on information received from a positioning system) by a monitored step count (e.g., based on information determined from another module of the system 300, from a pedometer, etc.) to determine an estimated stride length. Averages may, for example, be determined over time for a device and/or for a particular user of the device.

The SLE module 370 may, for example, select a stride length based at least in part on cadence (e.g., stepping rate or frequency), time taken for each step, etc. For example, a first cadence may be associated with a walking stride length, and a second cadence may be associated with a running stride length. In such a scenario, a cadence, for example output from another module of the system 300 and/or a pedometer module, may be indicative of the stride length.

The SLE module 370 may, for example, select a stride length based at least in part on impact. For example, an accelerometer may be utilized to detect an impact associated with a step to distinguish between running and walking stride lengths, to distinguish between users of different sizes and/or movement styles, etc.

The SLE module 370 may, for example, provide the estimated stride length to the TE module 330 and/or TB module 340 of the system 300. The SLE module 370 may also, for example, provide the estimated stride length as an output to an external system (e.g., to a host processor, operating system, etc.).

Various aspects of this disclosure may comprise a pedestrian heading change detection (PHCD) module 375. As discussed herein, utilizing only coefficients of the rotation matrix R (or DCM) may present challenges when a device (e.g., a mobile phone) is being manipulated in a substantial and unpredictable manner. In such a scenario, the analysis of one or more sensor values, for example transformed into the world coordinate system, may assist various pedestrian heading decisions. As an example, analysis of signals corresponding to one or more axes other than the world z axis, or in addition to the world z axis, may provide additional beneficial information.

For example, as a user walks or runs in an x-y direction, such movement will have a signature (e.g., associated with stepping-related impulses) associated with the movement. For example, even in a scenario in which the z-axis acceleration dominates, pedestrian walking and/or running motion also includes accelerations in the x-y plane caused by the impact and/or irregular nature of stepping. Analysis of, for example, accelerometer signals (e.g., transformed to the world coordinate system and/or left in a body coordinate system) may assist the determination of movement direction. For example, the accelerometer signals transformed to the x-y plane of the world coordinate system (e.g., $a_w^x$ and $a_w^y$ values) will generally have a signature that is independent of the manner in which the device is oriented.

The PHCD module 375 may, for example, output an indication of movement direction that may be utilized by one or more other modules (e.g., the TE module 330, the TB module 340, DAS module 320, etc.) of the system 300 to enhance their respective determinations. For example, if it has been determined that a movement direction has changed, the output from the PHCD module 375 may be utilized to verify, enhance, and/or correct the direction change determination. Similarly for example, if it has been determined that a movement direction has not been changed, the output from the PHCD module 375 may be utilized to verify, enhance, and/or correct the no-direction change determination.

Various aspects of this disclosure may also comprise a Trajectory Corrector (TC) module 380. As mentioned herein (e.g., in the discussion of the PHCD module 375), there may be multiple heading determinations calculated by the system. For example, the TE module 330 may determine a heading direction, and the PHCD module 375 may determine a heading direction, for example generally independent of the TC module's (or other module's) determination. In such a scenario, the TC module 380 may, for example based at least in part on signal levels and/or noise levels, select and/or combine the respective determinations of the other modules. For example, in a scenario in which the DHCD module 360 determines that a direction has changed, but the PHCD module 375 indicates that the travel direction has not changed (e.g., to a particular level of certainty), the TC module 380 may determine that the DHCD module 360 merely detected a change in phone orientation rather than direction and instruct the other modules (e.g., the TE module 330 and/or TB module 340) to ignore the DHCD module's detected direction change.

Various aspects of this disclosure may comprise a confidence estimator (CE) module 385. As discussed herein, the system 300 may output trajectory and/or location estimation information to other system components, for example to a device host processor, operating system, etc. The confidence estimator (CE) module 385 may operate to determine such a confidence level. Such a level may comprise a binary indication of "confident" or "not confident." Such a confidence level may also comprise a relatively finer resolution or degree of confidence (e.g., 50% confidence, 75% confidence, 90% confidence, etc.).

The CE module 385 may determine a level of confidence in any of a variety of manners. For example, the CE module 385 may consider individually and/or aggregate any of the confidence-related factors discussed herein. For example, if the output from the DHCD module 360 and the PHCD module 375 are in agreement, then the CE module 385 may assign a relatively high level of confidence to the trajectory output. Also for example, if no substantial direction changes have been detected by the DHCD module 260 and the PHCD module 375, then the CE module 385 may assign a relatively high level of confidence to the trajectory output. Additionally for example, if the CE module 385 receives a heading change indicator and/or gravity vector change indicator, the CE module 385 may assign a relatively low level of confidence to the trajectory output. A recipient (e.g., a host processor, an operation system, and/or other component of a host system) of the confidence level may thus determine whether to trust the trajectory output and/or whether to take action (e.g., by utilizing positioning system information).

Various aspects of this disclosure may also comprise an uncertainty estimator (UE) module 390. As discussed herein, depending on particular operating circumstances (e.g., unpredictable device orientation changes), the certainty of the trajectory estimation may become less. For example, a sharp turn might be caused by a user sharply turning or a device being sharply rotated while the user remains on a present trajectory.

In a scenario in which the trajectory becomes uncertain, the UE module 390 may track the level of uncertainty in relation to a last confidently known location. For example, when a rapid direction change occurs and the UE module 390 is not certain whether the direction change occurred as a result of user and/or device shift, the UE module 390 may begin building an uncertainty envelope around the location at which the turn was detected (e.g., at which the uncertainty began). For example, in an example implementation, the UE module 390 may begin defining a circle centered around the turning point and expanding in radius with each user step thereafter. For example, the radius of the uncertainly circle may grow at the estimated stride length with each detected step. The UE module 390 may then output information describing the uncertainty envelope (e.g., to a host or an operating system of a device).

For example, in a geofence scenario in which the device's last confidently-known position is well within the boundaries of the geofence, the recipient of the UE module's output may let the uncertainty envelope grow until it is determined that the uncertainty envelope nears or reaches the boundary of the geofence (e.g., indicating that it is possible that the user is at the geofence boundary). In another example in which the last confidently-known position is relatively near the boundary of the geofence, the recipient of the UE module's output may determine to immediately take action (e.g., utilizing other sensors and/or communication capabilities, for example positioning system functionality) to determine the location and/or trajectory of the device.

The systems illustrated in FIGS. 1-3, were presented to illustrate various aspects of the disclosure. Any of the systems presented herein may share any or all characteristics with any of the other systems presented herein. Additionally, it should be understood that the various modules were separated out for the purpose of illustrative clarity, and that the scope of various aspects of this disclosure should not be limited by arbitrary boundaries between modules and/or by particular characteristics of such modules. For example, any one or more of the modules may share hardware and/or software with any one or more other modules.

As discussed herein, any one or more of the modules and/or functions may be implemented by a pure hardware design and/or by a processor (e.g., an application or host processor, a sensor processor, etc.) executing software instructions. Similarly, other embodiments may comprise or provide a non-transitory computer readable medium and/or storage medium, and/or a non-transitory machine readable medium and/or storage medium, having stored thereon, a machine code and/or a computer program having at least one code section executable by a machine and/or a computer (or processor), thereby causing the machine and/or computer to perform the methods as described herein.

In summary, various aspects of the present disclosure provide a system and method for efficiently and accurately determining trajectory and/or position of a device (or user thereof). While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A trajectory tracking system comprising: a mobile device; at least one inertial sensor mounted in the mobile device; and at least one module comprising a processor, wherein the at least one module is in communication with the at least one inertial sensor and wherein the processor is operable to, at least:
- receive sensor information from the at least one inertial sensor;
- form a rotation matrix based at least in part on the received sensor information, wherein the rotation matrix comprises:
  - a plurality of vectors for projecting an input signal onto a horizontal plane of a world coordinate system, each of the plurality of vectors comprising a respective set of coefficients indicative of an orientation of the mobile device with respect to the world coordinate system; and
  - a gravity vector for projecting the input signal onto a vertical axis of the world coordinate system, the gravity vector comprising a plurality of gravity vector coefficients;
- select a vector of the plurality of vectors, based at least in part on a comparison between the gravity vector coefficients to identify which vector of the plurality of vectors projects most strongly onto the horizontal plane of the world coordinate system; and determine a trajectory of the mobile device, based at least in part on the respective set of coefficients of the selected vector.

2. The system of claim 1, wherein the at least one inertial sensor comprises: a gyroscope, an accelerometer, and a compass.

3. The system of claim 2, wherein the at least one inertial sensor and the at least one module are integrated in a single chip.

4. The system of claim 1, wherein the at least one module is operable to form a rotation matrix by, at least in part:
- determining an orientation associated with the at least one inertial sensor; and
- forming the rotation matrix to convert signals from the at least one inertial sensor to the world coordinate system.

5. The system of claim 1, wherein the plurality of vectors comprises:
- a first 2×1 vector for converting from an x-axis of a first coordinate system to the horizontal plane of the world coordinate system;
- a second 2×1 vector for converting from a y-axis of the first coordinate system to the horizontal plane of the world coordinate system; and
- a third 2×1 vector for converting from a z-axis of the first coordinate system to the horizontal plane of the world coordinate system.

6. The system of claim 1, wherein each of the plurality of vectors is normalized.

7. The system of claim 1, wherein the at least one module is operable to select a vector of the plurality of vectors by, at least in part:
- identifying a smallest coefficient of the gravity vector coefficients; and
- selecting the vector of the plurality of vectors that corresponds to the identified smallest coefficient.

8. The system of claim 1, wherein the at least one module is operable to determine a trajectory by, at least in part, setting a direction of the determined trajectory equal to a direction of the selected vector.

9. The system of claim 1, wherein the at least one module is operable to:
- generate a signal communicating the determined trajectory;
- determine a confidence level for the determined trajectory; and
- generate a signal indicative of the determined confidence level.

10. The system of claim 1, wherein the at least one module is operable to:
- generate a signal communicating the determined trajectory;
- determine whether the system has substantially tilted relative to a reference tilt; and
- generate a signal indicative of whether the system has substantially tilted relative to the reference tilt.

11. The system of claim 1, wherein the at least one module is operable to:
- generate a signal communicating the determined trajectory;
- determine whether the system has substantially changed travel direction relative to a reference travel direction; and
- generate a signal indicative of whether the system has substantially changed travel direction relative to the reference tilt.

12. The system of claim 1, wherein the at least one module is operable to:
- determine whether valid stepping is occurring; and
- output the determined trajectory only when it has been determined that valid stepping is occurring.

13. A trajectory tracking system comprising:
- a mobile device;
- at least one inertial sensor mounted in the mobile device; and
- at least one module comprising a processor, wherein the at least one module is in communication with the at least one inertial sensor and wherein the processor is operable to, at least:
  - receive sensor information from the at least one inertial sensor;
  - form a rotation matrix based at least in part on the received sensor information;
  - identify a first portion of the rotation matrix indicative of an orientation of the mobile device with respect to a world coordinate system, based at least in part on a second portion of the rotation matrix indicative of projection onto a vertical axis of the world coordinate system, wherein the identified first portion of the rotation matrix projects most strongly onto the horizontal plane of the world coordinate system;
  - determine an estimated travel direction of the mobile device, based at least in part on the identified first portion of the rotation matrix;
  - determine an estimated stride length of a user of the mobile device;
  - determine an estimated trajectory of the mobile device based, at least in part, on the estimated travel direction and the estimated stride length; and
  - generate a signal indicative of the estimated trajectory.

14. The system of claim 13, wherein the second portion of the rotation matrix is associated with projecting on a vertical axis of a world coordinate system.

15. The system of claim 14, wherein the identified first portion of the rotation matrix comprises only a 2×1 vector associated with projecting on a horizontal plane of the world coordinate system.

16. The system of claim 15, wherein the 2×1 vector comprises one of:

a first 2×1 vector for converting from an x-axis of a first coordinate system to the horizontal plane of the world coordinate system;

a second 2×1 vector for converting from a y-axis of the first coordinate system to the horizontal plane of the world coordinate system; and a third 2×1 vector for converting from a z-axis of the first coordinate system to the horizontal plane of the world coordinate system.

17. The system of claim 13, wherein the estimated stride length is variable.

18. The system of claim 13, wherein the at least one module is operable to determine the estimated stride length based, at least in part, on a user input.

19. The system of claim 13, wherein the at least one module is operable to empirically determine the estimated stride length based, at least in part, on a monitored step count and a monitored distance traveled.

20. The system of claim 13, wherein the at least one module is operable to determine the estimated stride length based, at least in part, on whether the user is walking or running.

21. A trajectory tracking system comprising:
a mobile device;
at least one inertial sensor mounted in the mobile device; and
at least one module comprising a processor, wherein the at least one module is in communication with the at least one inertial sensor and wherein the processor is operable to, at least:
receive, at a first update rate, sensor information associated with the at least one inertial sensor;
form, at a second update rate different from the first update rate, a rotation matrix based at least in part on the received sensor information;
identify a first portion of the rotation matrix indicative of an orientation of the mobile device with respect to a world coordinate system, based at least in part on a second portion of the rotation matrix indicative of projection onto a vertical axis of the world coordinate system, wherein the identified first portion of the rotation matrix projects most strongly onto the horizontal plane of the world coordinate system; and
determine an estimated trajectory of the mobile device, based at least in part on the identified first portion of the rotation matrix.

22. The system of claim 21, wherein the second update rate is based on a stepping cadence.

23. The system of claim 22, wherein the second update rate equals the stepping cadence.

24. The system of claim 21, wherein the second update rate is variable.

* * * * *